(12) United States Patent
Lin et al.

(10) Patent No.: US 11,700,373 B2
(45) Date of Patent: Jul. 11, 2023

(54) METHOD FOR CODING VIDEO AND RELATED DEVICE

(71) Applicant: BEIJING BAIDU NETCOM SCIENCE AND TECHNOLOGY CO., LTD., Beijing (CN)

(72) Inventors: Ke Lin, Beijing (CN); Wenpeng Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/129,504

(22) Filed: Dec. 21, 2020

(65) Prior Publication Data

US 2021/0409712 A1     Dec. 30, 2021

(30) Foreign Application Priority Data

Jun. 29, 2020  (CN) .......................... 202010615475.7

(51) Int. Cl.
*H04N 19/124*     (2014.01)
*H04N 19/136*     (2014.01)
*H04N 19/176*     (2014.01)
*H04N 19/177*     (2014.01)

(52) U.S. Cl.
CPC ......... *H04N 19/124* (2014.11); *H04N 19/136* (2014.11); *H04N 19/176* (2014.11); *H04N 19/177* (2014.11)

(58) Field of Classification Search
CPC ...... H04N 19/176; H04N 19/61; H04N 19/70; H04N 19/124; H04N 19/14; H04N 19/593; H04N 19/597; H04N 19/126; H04N 19/30; H04N 19/119; H04N 19/136

See application file for complete search history.

(56) References Cited

U.S. PATENT DOCUMENTS

| | | | |
|---|---|---|---|
| 2004/0179596 A1 | 9/2004 | Song et al. | |
| 2006/0203907 A1* | 9/2006 | Yang .................... | H04N 19/124 375/240.03 |
| 2008/0025392 A1 | 1/2008 | Lee et al. | |

(Continued)

FOREIGN PATENT DOCUMENTS

| CN | 101194518 A | 6/2008 |
|---|---|---|
| CN | 104811696 A | 7/2015 |

(Continued)

OTHER PUBLICATIONS

Extended European Search Report for EP Application No. 20213693.3, dated Feb. 8, 2021, 13 pages.

(Continued)

*Primary Examiner* — Farhan Mahmud
(74) *Attorney, Agent, or Firm* — Lippes Mathias LLP

(57) ABSTRACT

The present disclosure provides a method and an apparatus for coding a video, a device and a medium. An estimated quantization parameter of a target picture in a target GOP is determined. An inter-picture change degree of the target GOP is determined. A propagation ratio of a target picture block to a reference picture block in the target picture is determined based on the estimated quantization parameter of the target picture and the inter-picture change degree. The video is coded based on the propagation ratio.

18 Claims, 3 Drawing Sheets

(56) References Cited

U.S. PATENT DOCUMENTS

| | | | |
|---|---|---|---|
| 2011/0075730 A1* | 3/2011 | Samuelsson | H04N 19/142 375/240.03 |
| 2019/0089957 A1 | 3/2019 | Zhang et al. | |
| 2019/0253718 A1* | 8/2019 | Mao | H04N 19/184 |
| 2020/0413052 A1* | 12/2020 | Kudo | H04N 19/126 |

FOREIGN PATENT DOCUMENTS

| | | |
|---|---|---|
| CN | 111193927 A | 5/2020 |
| JP | 2004166088 A | 6/2004 |
| WO | 2014120960 A1 | 8/2014 |

OTHER PUBLICATIONS

Haibing Yin, "Quantization parameter cascading for video coding: leveraging a new temporal distortion propagation model", Springer-Verlag London 2016, published online Nov. 26, 2016, 8 pages.

K. McCann, "High Efficiency Video Coding (HEVC) Test Model 16 (HM 16) Improved Encoder Description", Joint Collaborative Team on Video Coding, 19th Meeting, Strasbourg, FR. Oct. 17-24, 2014, 27 pages.

Haibing Yin, "Distortion propagation modeling and its applications on frame level quantization control for predictive video coding", Elsevier, Signal Processing: Image Communication 78 (2019) p. 398-408.

Office Action for Japanese Application No. 2020-217666, dated Feb. 22, 2022, 2 pages.

Office Action for Korean Application No. 10-2020-0183224, dated Jul. 25, 2022, 6 pages.

Zhenyu Liu et al., "Optimize x265 Rate Control: an Exploration of Lookahead in Frame Bit Allocation and Slice Type Decision", IEEE Transactions on Image Processing, vol. 28, No. 5, Dec. 16, 2018, 16 pages.

Office Action for Chinese Application No. 202010615475.7, dated Oct. 18, 2022, 12 pages.

* cited by examiner

METHOD FOR CODING VIDEO AND RELATED DEVICE

CROSS REFERENCE TO RELATED APPLICATIONS

This application claims priority and benefits to Chinese Application No. 202010615475.7, filed on Jun. 29, 2020, the entire content of which is incorporated herein by reference.

TECHNICAL FIELD

The present disclosure relates to a field of video processing technologies, especially a field of video coding technologies, and more particular to a method and an apparatus for coding a video, a device and a medium.

BACKGROUND

High efficiency video coding (HEVC) standard is a new generation of video coding standard released by JCT-VC in 2013. Compared to previous advanced video coding (AVC) standard, HEVC standard is capable of saving up to 50% of bit rate under the same perceived quality.

SUMMARY

Embodiments of the present disclosure provide a method for coding a video. The method includes: determining an estimated quantization parameter of a target picture in a target group of pictures (GOP), in which the target GOP is associated to a video to be coded; determining an inter-picture change degree of the target GOP; determining a propagation ratio of a target picture block to a reference picture block in the target picture based on the estimated quantization parameter of the target picture and the inter-picture change degree; and coding the video to be coded based on the propagation ratio.

Embodiments of the present disclosure provide an electronic device. The electronic device includes: at least one processor, and a memory communicatively connected to the at least one processor. The memory is configured to store instructions executable by the at least one processor. When the instructions are executed by the at least one processor, the at least one processor is configured to implement a method for coding a video.

Embodiments of the present disclosure provide a computer-readable storage medium, having computer instructions stored thereon. When the instructions are executed, the at least one processor is caused to implement a method for coding a video.

It should be understood that the content described in this section is not intended to identify the key or important features of the embodiments of the disclosure, nor is it intended to limit the scope of the present disclosure. Additional features of the present disclosure will be easily understood by the following description.

BRIEF DESCRIPTION OF THE DRAWINGS

The drawings are used to better understand the solution and do not constitute a limitation to the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

The HEVC standard is widely applied to video services on different platforms (e.g., social networks, video on demand and 5G) to guarantee efficient transmission of large-scale video data. HEVC standard mainly relies on a hybrid video coding framework that performs intra/inter-picture prediction at the block level to obtain benefits from spatial and time redundancy respectively. The inter-picture prediction is to reduce coding time redundancy by coding residual of target blocks and reference blocks. CU-Tree (or MB-Tree) algorithm is a core algorithm that is used in HEVC encoders to significantly reduce the coding time redundancy by increasing code rate of the reference blocks.

The existing video coding method based on the CU-Tree algorithm is relatively simple and could not reduce sufficient coding time redundancy.

Therefore, the present disclosure provides a method and an apparatus for coding a video, a device and a storage medium.

Figure 1:
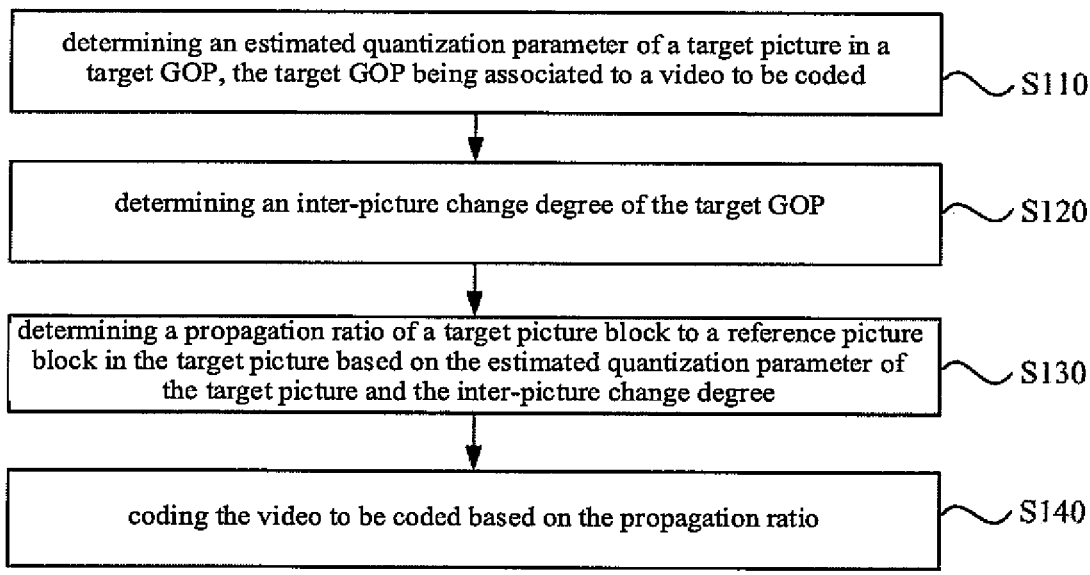
FIG. 1 is a flowchart illustrating a method for coding a video according to embodiments of the present disclosure.

FIG. 1 is a flowchart illustrating a method for coding a video according to embodiments of the present disclosure. Embodiments of the present disclosure are applicable to coding a video. The method may be executed by an apparatus for coding a video. The apparatus may be implemented by software and/or hardware, and may be generally integrated in an electronic device, such as a computer or a mobile phone.

In detail, as illustrated in FIG. 1, the method may include the following.

At block S110, an estimated quantization parameter of a target picture in a target group of pictures (GOP) is determined. The target GOP is associated to a video to be coded.

In embodiments, the video to be coded includes multiple GOPs. Each GOP includes multiple pictures. Each picture includes multiple picture blocks. The target GOP may be a GOP being currently processed in a lookahead process before coding the video.

In the related art, a high efficiency video coding (HEVC) coder may divide a sequence of pictures of the video into multiple GOPs based on an Intra-picture (I picture). Each GOP may be divided into multiple MiniGOPs based on predictive picture (P picture). In some embodiments, the above-mentioned target GOP may be the MiniGOP.

In the lookahead process before coding the video, multiple video processing algorithms may be used. For example, the propagation algorithm may be used to determine a reference relation between pictures based on the code structure of the MiniGOP, determining a reference relation between blocks through motion estimation, and propagating energy to a reference block in a unit of block based on the reference relation between the blocks. The energy propagated is a sum of an intra-picture coding cost value of the current picture block and the energy received. An energy propagation ratio is a ratio of an inter-picture prediction cost value to an intra-picture prediction cost value. In the current MiniGOP, the more energy the picture block receives, the more times of referring this picture block by other picture blocks. Therefore, the code rate of this picture block may be enhanced in coding the video.

For the propagation algorithm, such as a CU-Tree algorithm, reference degree is calculated on the input video. Therefore, it may be considered by default that the reference degree is not affected by the code rate in the calculation. However, in many actual cases, the higher the code rate, the lower the proportion of SKIP blocks and the smaller the time of referring the reference picture block by other picture blocks. By contrary, the lower the code rate, the higher the proportion of SKIP blocks and the higher the time of referring the reference picture block by other picture blocks. Therefore, when the energy propagation ratio is determined by considering the ratio of the inter-picture prediction cost value to the intra-picture prediction cost value, without taking the code rate of the reference degree into account, the final estimated picture block has a lower reference degree of referring to the reference picture block than an actual condition. As a result, sufficient time redundancy of coding the video cannot be removed.

In addition, performance of an existing propagation algorithm is poor in the case where the inter-picture prediction cost value and the intra-picture prediction cost value are small. In detail, in this case, the picture block is a simple block, and a difference between the picture block and the reference picture block is small. In selecting a mode, a bulk SKIP mode may be used to code the video. That is, the picture block is completely dependent on the reference picture block. However, in the propagation algorithm, since the intra-picture prediction cost value is small, it is possible that the ratio of the inter-picture prediction cost value to the intra-picture prediction cost value is not small. That is, the final estimated picture block has the lower reference degree of referring on the reference picture block than actually. As a result, sufficient time redundancy of coding the video cannot be removed.

In view to the above problems, embodiments of the present disclosure obtain the reference relation of the picture block referring on the reference picture block based on the code rate and picture content. Therefore, by taking the code rate and the picture content (two influencing factors) into consideration, the time redundancy of coding may be reduced and the code rate may be reduced. The code rate is characterized by the estimation quantization parameter of the picture. The picture content is characterized by an inter-picture change degree.

For example, since the quantization parameter of the picture is directly related to the code rate, the manner of determining the estimated quantization parameter of the target picture in the target GOP may include, but be not limited to, estimating the quantization parameter of the picture in the target MiniGOP by a controlling method based on a preset code rate. The preset code rate may be, for example, constant rate factor (CRF) or average bitrate (ABR). In detail, the controlling method used for the target GOP may be the controlling method used for a previous GOP. In embodiments, an average value of actual quantization parameters of each picture of the previous GOP obtained by the controlling method based on the code rate may be used as the estimated quantization parameter of each picture in the target GOP.

At block S120, an inter-picture change degree of the target GOP is determined.

In embodiments, the inter-picture change degree may be an index to measure a change in the picture content between the pictures of the target GOP. That is, the inter-picture change degree may represent a scene motion intensity of the target GOP.

In some implementations, determining the inter-picture change degree of the target GOP may include determining the inter-picture change degree of the target GOP based on the number of target pictures in the target GOP and an intra-picture block ratio of the target GOP.

In detail, in cases that the number of pictures included in the target GOP is greater than a preset number threshold and the intra-picture block ratio is less than a preset ratio threshold, it may be determined that the inter-picture change degree of the target GOP is small. In cases that the number of pictures included in the target GOP is not greater than the preset number threshold or the number of the intra-picture block ratio is not less than the preset ratio threshold, it may be determined that the inter-picture change degree of the target GOP is large.

The intra-picture block ratio is a ratio of the number of picture blocks of intra-picture prediction in the target GOP to the number of picture blocks of inter-picture prediction in the target GOP.

By using the number of the target pictures in the target GOP and the intra-picture block ratio of the target GOP to determine the inter-picture change degree of the target GOP, changes in the picture content between the pictures in the target GOP may be comprehensively and accurately reflected. In addition, the propagation ratio of the target picture block to the reference picture block determined based on the inter-picture change degree may be accurate, the time redundancy of coding the video may be reduced, and the code rate may be saved.

At block S130, a propagation ratio of a target picture block to a reference picture block in the target picture is determined based on the estimated quantization parameter of the target picture and the inter-picture change degree.

For example, the propagation ratio of the target picture block to the reference picture block in the target picture may be roughly estimated. The roughly estimated propagation ratio may be adjusted based on the estimated quantization parameter of the target picture and the inter-picture change degree, to obtain an accurate propagation ratio. The manner of roughly estimating the propagation ratio of the target picture block to the reference picture block in the target picture may include, but be not limited to, determining the ratio of the inter-picture prediction cost value to the intra-picture prediction cost value as the propagation ratio to be adjusted.

At block S140, the video to be coded is coded based on the propagation ratio.

In embodiments, a preset propagation algorithm may be used to code the video to be coded based on the propagation ratio. The preset propagation algorithm includes, but is not limited to, the CU-Tree algorithm.

In detail, based on the preset propagation algorithm, the energy is propagated based on the propagation ratio to determine the energy received corresponding to each picture block in the target GOP. An offset of the quantization parameter of each picture block may be determined based on the energy received. The quantization parameter corresponding to the picture block may be obtained by summing the estimated quantization parameter of the picture including the picture block and the offset of the quantization parameter of the picture block. In a subsequent coding process, the coding may be performed based on the quantization parameter corresponding to each picture block in the target GOP. The above process may be performed on all GOPs included in the video to be coded to realize the coding process of the video to be coded.

With the technical solution according to embodiments, the estimated quantization parameter of the target picture in the target GOP associated to the video to be coded is determined. The inter-picture change degree of the target GOP is determined. The propagation ratio of the target picture block to the reference picture block in the target picture is determined based on the estimated quantization parameter of the target picture and the inter-picture change degree. The video to be coded is coded based on the propagation ratio. Therefore, the problem that sufficient time redundancy of coding the video cannot be reduced in the related art may be solved, such that the video coding process is optimized, time redundancy of coding the video is reduced, and the code rate is saved.

The present disclosure also provides a method for coding a video according to embodiments of the present disclosure.

Figure 2:
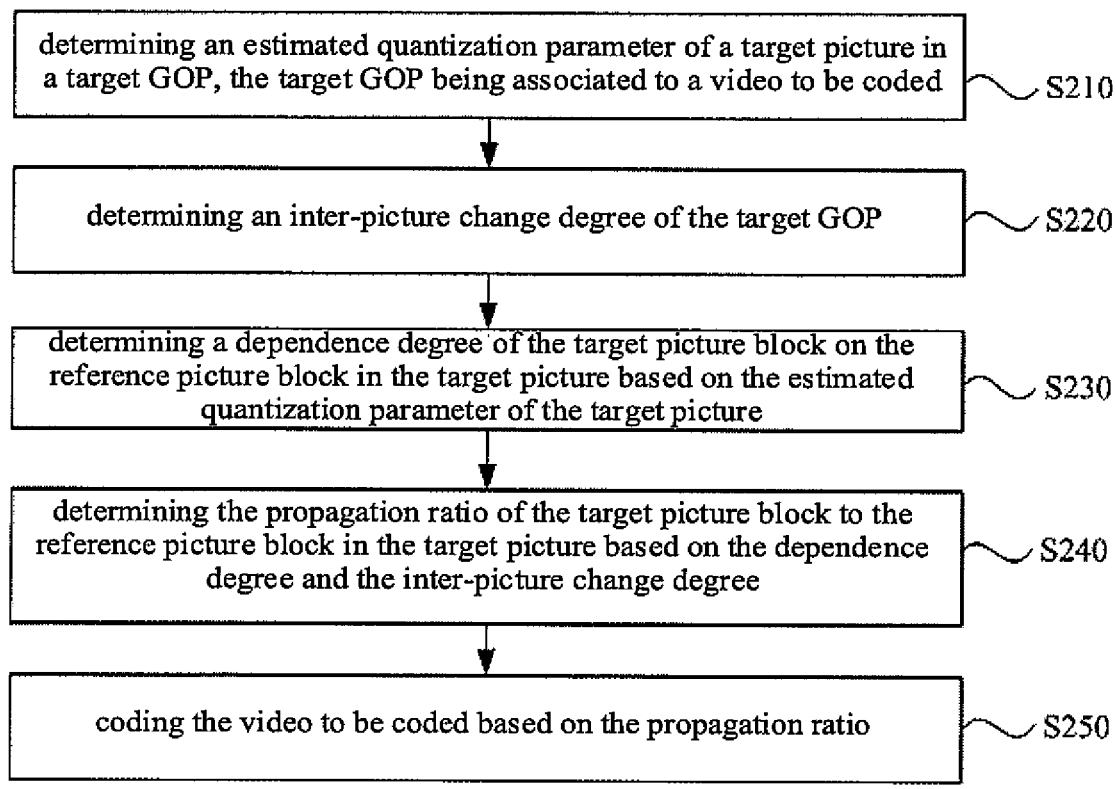
FIG. 2 is a flowchart illustrating a method for coding a video according to embodiments of the present disclosure.

FIG. 2 is a flowchart illustrating a method for coding a video according to embodiments of the present disclosure. The method illustrated in FIG. 1 will be described in detail. For example, determining the propagation ratio of the target picture block to the reference picture block in the target picture based on the estimated quantization parameter of the target picture and the inter-picture change degree may include: determining a dependence degree of the target picture block on the reference picture block in the target picture based on the estimated quantization parameter of the target picture; and determining the propagation ratio of the target picture block to the reference picture block in the target picture based on the dependence degree and the inter-picture change degree.

In detail, as illustrated in FIG. 2, the method may further include the following.

At block S210, an estimated quantization parameter of a target picture in a target GOP is determined. The target GOP is associated to a video to be coded.

At block S220, an inter-picture change degree of the target GOP is determined.

At block S230, a dependence degree of the target picture block on the reference picture block in the target picture is determined based on the estimated quantization parameter of the target picture.

In embodiments, the target picture may be a picture being currently processed in the target GOP. The estimated quantization parameter may be used to determine the number of picture blocks in the target picture, the propagation ratios of the picture blocks need to be improved. When the code rate is low, that is, when the estimated quantization parameter of the picture is high, the number of picture blocks that meet a preset dependency degree condition is high and a high number of picture blocks in the target picture need to be adjusted. When the code rate is high, that is, when the estimated quantization parameter of the picture is low, the number of picture blocks that meet the preset dependency degree condition is low and a low number of picture blocks in the target picture need to be adjusted.

In some implementations, determining the dependence degree of the target picture block on the reference picture block in the target picture based on the estimated quantization parameter of the target picture may include: determining an inter-picture cost threshold based on the estimated quantization parameter of the target picture; and determining the dependence degree of the target picture block on the reference picture block in the target picture based on an inter-picture prediction cost value of the target picture block and the inter-picture cost threshold.

The inter-picture cost threshold may be generated by a preset threshold function based on the estimated quantization parameter of the target picture. The threshold function may be a polynomial function. Parameters of the threshold function may be determined by fitting results obtained from multiple video sequences.

For example, in cases that the inter-picture prediction cost value of the target picture block is less than the inter-picture cost threshold, it may be determined that the dependence degree of the target picture block on the reference picture block in the target picture is large. In cases that the inter-picture prediction cost value of the target picture block is not less than the inter-picture cost threshold, it may be determined that the dependence degree of the target picture block to the reference picture block in the target picture is small.

By determining the dependence degree of the target picture block on the reference picture block in the target picture based on the inter-picture cost threshold determined from the estimated quantization parameter of the target picture, the number of target picture blocks strongly dependent on the reference picture block in the target picture may be determined dynamically based on the code rate. Further, the propagation ratios of these target picture blocks may be increased to reduce the time redundancy of coding the video.

At block S240, the propagation ratio of the target picture block to the reference picture block in the target picture is determined based on the dependence degree and the inter-picture change degree.

For example, the propagation ratio obtained directly based on the ratio of the inter-picture prediction cost value to the intra-picture prediction cost value may be updated and adjusted based on the dependence degree and the inter-picture change degree of the target GOP, to generate an accurate propagation ratio.

In some implementations, determining the propagation ratio of the target picture block to the reference picture block in the target picture based on the dependence degree and the inter-picture change degree may include: determining an adjustment mode of the propagation ratio based on the dependence degree and the inter-picture change degree; and adjusting the propagation ratio of the target picture block to the reference picture block in the target picture based on the adjustment mode and a preset adjustment value for adjusting the propagation ratio.

The adjustment mode may be increasing the propagation ratio. In detail, in cases that the dependence degree of target picture block on the reference picture block in the target picture is large and the inter-picture change degree of the target GOP is low, meaning that the reference degree of referring to the reference picture block by the target picture block is high, the propagation ratio of the target picture block to the reference picture block is increased. That is, based on the preset adjustment value for adjusting the propagation ratio, the propagation ratio of the target picture block to the reference picture block in the target picture is increased. The preset adjustment value for adjusting the propagation ratio is obtained by fitting the results obtained from the multiple video sequences.

By adjusting the propagation ration based on the code rate and the scene motion intensity that affects the propagation ratio to obtain an accurate propagation ratio, thereby effectively reducing the time redundancy of coding the video, and reducing the overall code rate under the same perceptual quality by up to 10%.

At block S250, the video to be coded is coded based on the propagation ratio.

With the technical solution according to embodiments, the dependence degree of the target picture block on the reference picture block in the target picture is determined based on the estimated quantization parameter of the target picture. The propagation ratio of the target picture block to the reference picture block in the target picture is determined based on the dependence degree and the inter-picture change degree of the target GOP. The video to be coded is coded based on the propagation ratio. With the impact of the code rate and the scene motion intensity on the propagation ratio, the time redundancy of coding the video may be reduced and the code rate may be saved.

The present disclosure also provides a method for coding a video according to embodiments of the present disclosure.

Figure 3:
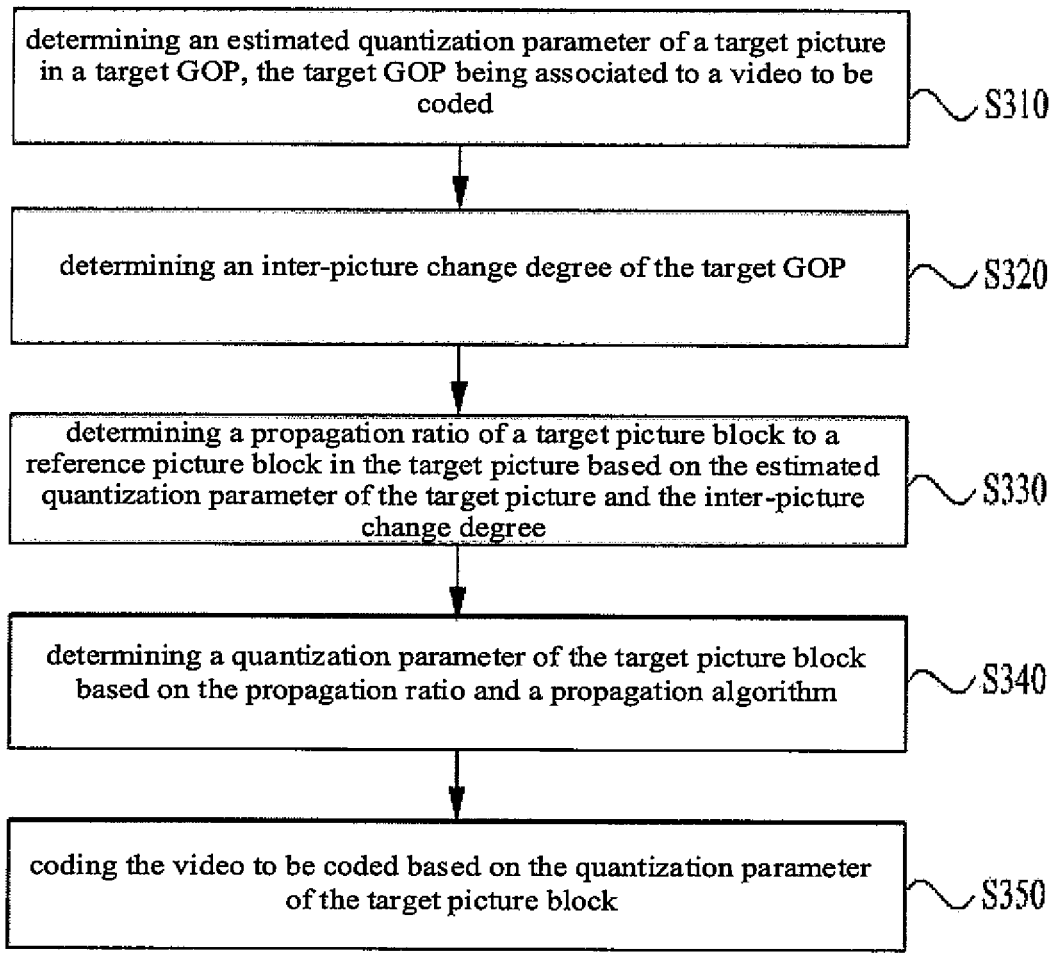
FIG. 3 is a flowchart illustrating a method for coding a video according to embodiments of the present disclosure.

FIG. 3 is a flowchart illustrating a method for coding a video according to embodiments of the present disclosure. Embodiments of FIGS. 1 and 2 will be described in detail below. For example, coding the video to be coded based on the propagation ratio may include determining a quantization parameter of the target picture block based on the propagation ratio and a propagation algorithm; and coding the video to be coded based on the quantization parameter of the target picture block.

In detail, as illustrated in FIG. 3, the method may include the following.

At block S310, an estimated quantization parameter of a target picture in a target GOP is determined. The target GOP is associated to a video to be coded.

At block S320, an inter-picture change degree of the target GOP is determined.

At block S330, a propagation ratio of the target picture block to the reference picture block in the target picture is determined based on the estimated quantization parameter and the inter-picture change degree.

At block S340, a quantization parameter of the target picture block is determined based on the propagation ratio and a propagation algorithm.

In embodiments, the propagation algorithm may be, for example, the CU-Tree algorithm. After obtaining the propagation ratio of the target picture block to the reference picture block in the target picture, the quantization parameter of the target picture block is determined based on the propagation ratio. The quantization parameter of the target picture block is obtained based on the estimated quantization parameter of the picture including the target picture block and the offset of the quantization parameter of the target picture block. In detail, the quantization parameter of the target picture block equals to a sum of the estimated quantization parameter of the picture and the offset of the quantization parameter of the target picture block. Each picture has a basic quantization parameter, and each picture block has an individual offset. For the CU-Tree algorithm, the offset of the quantization parameter of each picture block may be negative.

In some implementations, determining the quantization parameter of the target picture block based on the propagation ratio and the propagation algorithm may include: performing CU-Tree energy propagation based on the propagation ratio to obtain received energy of the target picture block; converting the received energy into the offset of the quantization parameter of the target picture block based on the inter-picture change degree of the target GOP; and determining the quantization parameter of the target picture block based on the offset of the quantization parameter of the target picture block and the estimated quantization parameter of the target picture including the target picture block.

The more energy the picture block receives, the higher the times of referring to the picture block by other picture blocks. Therefore, the received energy of the target picture block may be converted into the offset of the quantization parameter of the target picture block. In detail, in embodiments, in converting the received energy into the offset of the quantization parameter, the scene motion intensity may be further taken into consideration. That is, the energy is converted based on the inter-picture change degree of the target GOP. In detail, the offset of the quantization parameter is used to adjust the quantization parameter of each picture block, such that a picture block with a high quantization parameter is coded with less detail, while a picture block with a low quantization parameter is coded with more detail.

By converting the received energy into the offset of the quantization parameter based on the inter-picture change degree of the target GOP, the scene motion intensity is taken into consideration. Therefore, by considering the scene motion intensity, when the motion intensity is large, the reference degree of referring to the reference picture block by the picture block is reduced. When the motion intensity is low (i.e. static), the reference degree of referring to the reference picture block by the picture block is improved. Therefore, the accuracy of the quantization parameter of each picture block may be improved, the time redundancy of coding the video may be reduced, and picture quality may be ensured.

In some embodiments, converting the received energy into the offset of the quantization parameter of the target picture block based on the inter-picture change degree may include determining a parameter offset value based on the inter-picture change degree; and converting the received energy into the offset of the quantization parameter of the target picture block based on the parameter offset value.

In detail, according to the formula: QP_offset=(−1) *intensity*log(1+energy/IntraCost), the received energy may be converted into the offset of the quantization parameter, where QP_offset represents the offset of the quantization parameter of the target picture block, IntraCost represents the intra-picture prediction cost value, the "intensity" represents the parameter offset value, and the "energy" represents the received energy of the target picture block. The initial value of the parameter offset value may be a default value set based on experience.

For example, when the inter-picture change degree of the target GOP is large, that is, when the scene motion intensity is large (i.e., the motion is severe), the parameter offset value in the above formula may be increased. When the inter-picture change degree of the target GOP is small, that is, when the scene motion intensity is low (i.e., static), the parameter offset value in the above formula may be decreased. An adjustment range may be obtained by fitting the adjustment results of the multiple video sequences.

Based on the inter-picture change degree of the target GOP, the parameter offset value may be determined to further change the value of the offset of the quantization parameter. In this case, the reference degree of referring to the reference picture block by the picture block may be reduced when the motion is severe, while the reference degree of referring to the reference picture block by the picture block may be improved when the motion is static, thereby improving the accuracy of the quantization parameter of each picture block and reducing the time redundancy of coding the video while ensuring the picture quality.

At block S350, the video to be coded is coded based on the quantization parameter of the target picture block.

After obtaining the quantization parameter of the target picture block, the quantization parameters of each picture block in the target GOP are obtained sequentially. Subsequent formal coding process is performed in a unit of GOP. In the formal coding process, the video is coded based on the quantization parameters of each picture block until all GOPs associated with the video to be coded are coded, thereby realizing the coding process of the video to be coded.

With the technical solution of embodiments, on the basis of the above-mentioned embodiments, in the process of determining the quantization parameter of the target picture block, the inter-picture change degree of the target GOP is comprehensively considered, to obtain an accurate quantization parameter of the picture block, thereby further reducing the time redundancy of coding the video and saving the code rate.

The present disclosure also provides an apparatus for coding a video according to an embodiment of the present disclosure.

Figure 4:
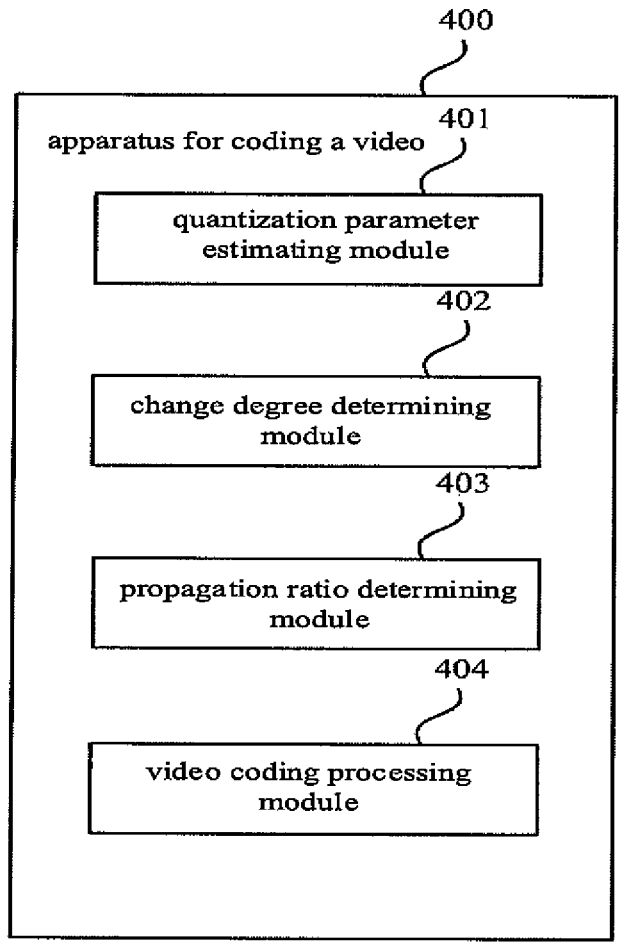
FIG. 4 is a block diagram illustrating an apparatus for coding a video according to embodiments of the present disclosure.

FIG. 4 is a schematic diagram of an apparatus for coding a video according to an embodiment of the present disclosure. The device may be implemented by software and/or hardware, and execute the method for coding a video as described in any embodiment of the present disclosure. In detail, the apparatus for coding the video 400 includes: a quantization parameter estimating module 401, a change degree determining module 402, a propagation ratio determining module 403 and a video coding processing module 404.

The quantization parameter estimating module 401 is configured to determine an estimated quantization parameter of a target picture in a target group of pictures (GOP), in which the target GOP is associated to a video to be coded.

The change degree determining module 402 is configured to determine an inter-picture change degree of the target GOP.

The propagation ratio determining module 403 is configured to determine a propagation ratio of a target picture block to a reference picture block in the target picture based on the estimated quantization parameter of the target picture and the inter-picture change degree.

The video coding processing module 404 is configured to code the video to be coded based on the propagation ratio.

In some embodiments, the propagation ratio determining module 403 includes: a degree determining submodule and a ratio determining submodule. The degree determining submodule is configured to determine a dependence degree of the target picture block on the reference picture block in the target picture based on the estimated quantization parameter of the target picture. The ratio determining submodule is configured to determine the propagation ratio of the target picture block to the reference picture block in the target picture based on the dependence degree and the inter-picture change degree.

In some embodiments, the ratio determining submodule further includes: a mode determining unit and a ratio adjusting unit. The mode determining unit is configured to determine an adjustment mode of the propagation ratio based on the dependence degree and the inter-picture change degree. The ratio adjusting unit is configured to adjust the propagation ratio of the target picture block to the reference picture block in the target picture based on the adjustment mode and a preset adjustment value for adjusting the propagation ratio.

In some embodiments, the degree determining submodule further includes: a threshold determining unit and a cost comparing unit. The threshold determining unit is configured to determine an inter-picture cost threshold based on the estimated quantization parameter of the target picture. The cost comparing unit is configured to determine the dependence degree of the target picture block on the reference picture block in the target picture based on an inter-picture prediction cost value of the target picture block and the inter-picture cost threshold.

In some embodiments, the change degree determining module 402 is further configured to determine the inter-picture change degree based on the number of target pictures in the target GOP and an intra-picture block ratio of the target GOP.

In some embodiments, the video coding processing module 404 further includes: a parameter determining submodule and a video coding submodule. The parameter determining submodule is configured to determine a quantization parameter of the target picture block based on the propagation ratio and a propagation algorithm. The video coding submodule is configured to code the video to be coded based on the quantization parameter of the target picture block.

In some embodiments, the parameter determining submodule includes: an energy receiving unit, an energy converting unit and a parameter determining unit. The energy receiving unit is configured to perform CU-Tree energy propagation based on the propagation ratio to obtain received energy of the target picture block. The energy converting unit is configured to convert the received energy into an offset of the quantization parameter of the target picture block based on the inter-picture change degree. The parameter determining unit is configured to determine the quantization parameter of the target picture block based on the offset of the quantization parameter of the target picture block and the estimated quantization parameter of the target picture including the target picture block.

In some embodiments, the energy converting unit further includes: a value determining subunit and an offset determining subunit. The value determining subunit is configured to determine a parameter offset value based on the inter-picture change degree. The offset determining subunit is configured to convert the received energy into the offset of the quantization parameter of the target picture block based on the parameter offset value.

The apparatus for coding the video according to the embodiment of the present disclosure executes the method for coding the video according to any embodiment of the present disclosure, and has the corresponding functional modules and beneficial effects for executing the method.

According to the embodiments of the present disclosure, the present disclosure also provides an electronic device and a readable storage medium.

Figure 5:
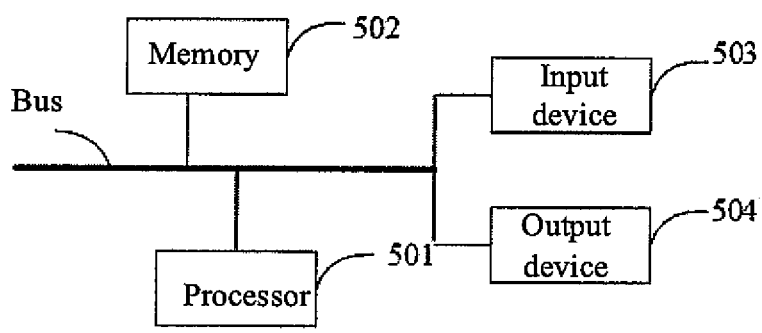
FIG. 5 is a block diagram illustrating an electronic device used to implement a method for coding a video according to embodiments of the present disclosure.

FIG. 5 is a block diagram of an electronic device used to implement the method for coding a video according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the present disclosure. The memory stores instructions executable by at least one processor, so that the at least one processor executes the method for coding a video according to the present disclosure. The non-transitory computer-readable storage medium of the present disclosure stores computer instructions, which are used to cause a computer to execute the method for coding the video according to the present disclosure.

As a non-transitory computer-readable storage medium, the memory 502 is configured to store non-transitory software programs, non-transitory computer executable programs and modules, such as program instructions/modules corresponding to the method for coding the video in the embodiment of the present disclosure (For example, the quantization parameter estimating module 401, the change degree determining module 402, the propagation ratio determining module 403 and the video coding processing module 404 shown in FIG. 4). The processor 501 executes various functional applications and data processing of the server by running non-transitory software programs, instructions, and modules stored in the memory 502, that is, implementing the method for coding the video in the foregoing method embodiments.

The memory 502 may include a storage program area and a storage data area, where the storage program area may store an operating system and application programs required for at least one function. The storage data area may store data created according to the use of the electronic device, and the like. In addition, the memory 502 may include a high-speed random access memory, and a non-transitory memory, such as at least one magnetic disk storage device, a flash memory device, or other non-transitory solid-state storage device. In some embodiments, the memory 502 may include a memory remotely disposed with respect to the processor 501, and these remote memories may be connected to the electronic device through a network. Examples of the above network include, but are not limited to, the Internet, an intranet, a local area network, a mobile communication network, and combinations thereof.

The electronic device for implementing the method for coding the video may further include: an input device 503 and an output device 504. The processor 501, the memory 502, the input device 503, and the output device 504 may be connected through a bus or in other manners. In FIG. 5, the connection through the bus is taken as an example.

The input device 503 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client may be, but is not limited to, a smart phone, a tablet computer, a notebook computer, a desktop computer, a smart speaker, and a smart watch. The server may be an independent physical server, a server cluster or a distributed system composed of multiple physical servers, or a cloud server that provides basic cloud computing services such as cloud computing, cloud services, cloud databases, and cloud storage. The client and server are generally remote from each other and interacting through a communication network. The client-server relation is generated by computer programs running on the respective computers and having a client-server relation with each other.

With the technical solution according to embodiments, the estimated quantization parameter of the target picture in the target GOP associated to the video to be coded is determined. The inter-picture change degree of the target GOP is determined. The propagation ratio of the target picture block to the reference picture block in the target picture is determined based on the estimated quantization parameter of the target picture and the inter-picture change degree. Finally, the video to be coded is coded based on the propagation ratio. Therefore, the problem that sufficient time redundancy of coding the video cannot be reduced in the related art is solved, and effect of optimizing the video coding process is achieved, time redundancy of coding the video is reduced, and code rate is saved.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A computer-implemented method for coding a video, comprising:
   determining an estimated quantization parameter of a target picture in a target group of pictures (GOP), wherein the target GOP is associated to the video, the estimated quantization parameter is an average value of actual quantization parameters of the target picture in a previous GOP and the estimated quantization parameter is configured to indicate a number of picture blocks in the target picture for increasing a propagation ratio;
   determining an inter-picture change degree of the target GOP based on a number of target pictures included in the target GOP and an intra-picture block ratio of the target GOP, in which the intra-picture block ratio is a ratio of the number of picture blocks for performing intra-picture prediction in the target GOP to the number of picture blocks for performing inter-picture prediction in the target GOP, and the inter-picture change degree is an index to measure a change in the picture content between the pictures of the target GOP;
   determining a propagation ratio of a target picture block to a reference picture block in the target picture based on the estimated quantization parameter of the target picture and the inter-picture change degree; and
   coding the video based on the propagation ratio;
   wherein coding the video comprises:
   performing coding unit (CU)-Tree energy propagation based on the propagation ratio to obtain received energy of the target picture block;
   converting the received energy into an offset of the quantization parameter of the target picture block by an equation of
   QP_offset=(−1)*intensity*log(1+energy/IntraCost),
   where QP_offset is the offset of the quantization parameter of the target picture block, energy represents the received energy, intensity represents the parameter offset value, IntraCost represents the intra-picture prediction cost value, and −1 indicates the value of QP_offset is negative.

2. The computer-implemented method according to claim 1, wherein determining the propagation ratio comprises:
   determining a dependence degree of the target picture block on the reference picture block in the target picture based on the estimated quantization parameter of the target picture; and
   determining the propagation ratio of the target picture block to the reference picture block in the target picture by adjusting a ratio of an inter-picture prediction cost value to an intra-picture prediction cost value based on the dependence degree and the inter-picture change degree.

3. The computer-implemented method according to claim 2, wherein determining the propagation ratio of the target picture block to the reference picture block in the target picture based on the dependence degree and the inter-picture change degree comprises:
   determining an adjustment mode of the propagation ratio based on the dependence degree and the inter-picture change degree; and
   adjusting the propagation ratio of the target picture block to the reference picture block in the target picture based on the adjustment mode and a preset adjustment value for adjusting the propagation ratio.

4. The computer-implemented method according to claim 2, wherein the determining the dependence degree of the target picture block on the reference picture block in the target picture based on the estimated quantization parameter of the target picture comprises:
   determining an inter-picture cost threshold based on the estimated quantization parameter of the target picture; and
   determining the dependence degree of the target picture block on the reference picture block in the target picture based on an inter-picture prediction cost value of the target picture block and the inter-picture cost threshold.

5. The computer-implemented method according to claim 1, wherein the coding the video to be coded further comprises:
   determining a quantization parameter of the target picture block based on the propagation ratio and a propagation algorithm; and
   coding the video based on the quantization parameter of the target picture block.

6. The computer-implemented method according to claim 5, wherein the determining the quantization parameter of the target picture block based on the propagation ratio and the propagation algorithm comprises:
  converting the received energy into the offset of the quantization parameter of the target picture block based on the inter-picture change degree; and
  determining the quantization parameter of the target picture block based on the offset of the quantization parameter of the target picture block and the estimated quantization parameter of the target picture comprising the target picture block.

7. The computer-implemented method according to claim 6, wherein converting the received energy into the offset of the quantization parameter of the target picture block based on the inter-picture change degree comprises:
  determining a parameter offset value based on the inter-picture change degree; and
  converting the received energy into the offset of the quantization parameter of the target picture block based on the parameter offset value.

8. An electronic device, comprising:
  at least one processor; and
  a memory, connected in communication with the at least one processor;
  wherein, the memory is configured to store instructions executable by the at least one processor, when the instructions are executed by the at least one processor, the at least one processor is configured to:
  determine an estimated quantization parameter of a target picture in a target group of pictures (GOP), wherein the target GOP is associated to the video, the estimated quantization parameter is an average value of actual quantization parameters of the target picture in a previous GOP and the estimated quantization parameter is configured to indicate a number of picture blocks in the target picture for increasing a propagation ratio;
  determine an inter-picture change degree of the target GOP based on the number of target pictures included in the target GOP and an intra-picture block ratio of the target GOP, in which the intra-picture block ratio is a ratio of the number of picture blocks for performing intra-picture prediction in the target GOP to the number of picture blocks for performing inter-picture prediction in the target GOP, and the inter-picture change degree is an index to measure a change in the picture content between the pictures of the target GOP;
  determine a propagation ratio of a target picture block to a reference picture block in the target picture based on the estimated quantization parameter of the target picture and the inter-picture change degree; and
  code the video based on the propagation ratio;
  wherein coding the video comprises:
  performing coding unit (CU)-Tree enemy propagation based on the propagation ratio to obtain received energy of the target picture block;
  converting the received energy into an offset of the quantization parameter of the target picture block by an equation of
  QP_offset=(−1)*intensity*log(1+energy/IntraCost),
    where QP_offset is the offset of the quantization parameter of the target picture block, energy represents the received energy, intensity represents the parameter offset value, IntraCost represents the intra-picture prediction cost value, and −1 indicates the value of QP_offset is negative.

9. The electronic device according to claim 8, wherein the at least one processor is configured to:
  determine a dependence degree of the target picture block on the reference picture block in the target picture based on the estimated quantization parameter of the target picture; and
  determine the propagation ratio of the target picture block to the reference picture block in the target picture by adjusting a ratio of an inter-picture prediction cost value to an intra-picture prediction cost value based on the dependence degree and the inter-picture change degree.

10. The electronic device according to claim 9, wherein the at least one processor is configured to:
  determine an adjustment mode of the propagation ratio based on the dependence degree and the inter-picture change degree; and
  adjust the propagation ratio of the target picture block to the reference picture block in the target picture based on the adjustment mode and a preset adjustment value for adjusting the propagation ratio.

11. The electronic device according to claim 9, wherein the at least one processor is configured to:
  determine an inter-picture cost threshold based on the estimated quantization parameter of the target picture; and
  determine the dependence degree of the target picture block on the reference picture block in the target picture based on an inter-picture prediction cost value of the target picture block and the inter-picture cost threshold.

12. The electronic device according to claim 8, wherein the at least one processor is further configured to:
  determine a quantization parameter of the target picture block based on the propagation ratio and a propagation algorithm; and
  code the video based on the quantization parameter of the target picture block.

13. The electronic device according to claim 12, wherein the at least one processor is further configured to:
  convert the received energy into the offset of the quantization parameter of the target picture block based on the inter-picture change degree; and
  determine the quantization parameter of the target picture block based on the offset of the quantization parameter of the target picture block and the estimated quantization parameter of the target picture comprising the target picture block.

14. The electronic device according to claim 13, wherein the at least one processor is further configured to:
  determine a parameter offset value based on the inter-picture change degree; and
  convert the received energy into the offset of the quantization parameter of the target picture block based on the parameter offset value.

15. A non-transitory computer-readable storage medium, having computer instructions stored thereon, wherein when the computer instructions are executed, the computer is caused to implement a method for coding a video, the method comprising:
  determining an estimated quantization parameter of a target picture in a target group of pictures (GOP), wherein the target GOP is associated to the video, the estimated quantization parameter is an average value of actual quantization parameters of the target picture in a previous GOP and the estimated quantization parameter is configured to indicate a number of picture blocks in the target picture for increasing a propagation ratio;

determining an inter-picture change degree of the target GOP based on a number of target pictures included in the target GOP and an intra-picture block ratio of the target GOP, in which the intra-picture block ratio is a ratio of the number of picture blocks for performing intra-picture prediction in the target GOP to the number of picture blocks for performing inter-picture prediction in the target GOP, and the inter-picture change degree is an index to measure a change in the picture content between the pictures of the target GOP;

determining a propagation ratio of a target picture block to a reference picture block in the target picture based on the estimated quantization parameter of the target picture and the inter-picture change degree; and coding the video based on the propagation ratio;

wherein coding the video comprises:

performing coding unit (CU)-Tree energy propagation based on the propagation ratio to obtain received energy of the target picture block;

converting the received energy into an offset of the quantization parameter of the target picture block by an equation of QP_offset=(−1)*intensity*log(1+energy/IntraCost), where QP_offset is the offset of the quantization parameter of the target picture block, energy represents the received energy, intensity represents the parameter offset value, IntraCost represents the intra-picture prediction cost value, and −1 indicates the value of QP_offset is negative.

16. The non-transitory computer-readable storage medium according to claim 15, wherein determining the propagation ratio comprises:

determining a dependence degree of the target picture block on the reference picture block in the target picture based on the estimated quantization parameter of the target picture; and determining the propagation ratio of the target picture block to the reference picture block in the target picture by adjusting a ratio of an inter-picture prediction cost value to an intra-picture prediction cost value based on the dependence degree and the inter-picture change degree.

17. The non-transitory computer-readable storage medium according to claim 16, wherein determining the propagation ratio of the target picture block to the reference picture block in the target picture based on the dependence degree and the inter-picture change degree comprises:

determining an adjustment mode of the propagation ratio based on the dependence degree and the inter-picture change degree; and adjusting the propagation ratio of the target picture block to the reference picture block in the target picture based on the adjustment mode and a preset adjustment value for adjusting the propagation ratio.

18. The non-transitory computer-readable storage medium according to claim 16, wherein the determining the dependence degree of the target picture block on the reference picture block in the target picture based on the estimated quantization parameter of the target picture comprises:

determining an inter-picture cost threshold based on the estimated quantization parameter of the target picture; and determining the dependence degree of the target picture block on the reference picture block in the target picture based on an inter-picture prediction cost value of the target picture block and the inter-picture cost threshold.

* * * * *